United States Patent Office 2,917,491
Patented Dec. 15, 1959

2,917,491
DIEPOXIDE POLYMERS

Benjamin Phillips and Paul S. Starcher, Charleston, Charles W. McGary, Jr., South Charleston, and Charles T. Patrick, Jr., St. Albans, W. Va., assignors to Union Carbide Corporation, a corporation of New York No Drawing. Application June 1, 1956
Serial No. 588,601

15 Claims. (Cl. 260—78.4)

This invention is directed to polymerizable compositions, polymerized compositions prepared therefrom and methods of preparing said polymerized compositions. More particularly, this invention is directed to polymerizable compositions of diepoxides and, in particular, bis-(3,4-epoxycyclohexylmethyl) hydrocarbon dicarboxylate compounds, and mixtures thereof, and polymerized compositions produced therefrom. These compositions are useful in the arts of molding, casting, coating, laminating, calendering, adhesives and the like, for producing insoluble, infusible compositions.

The polymerizable compositions of this invention comprise mixtures of catalysts and diepoxides, in particular, bis-(3,4-epoxycyclohexylmethyl) hydrocarbon dicarboxylate compounds which can be characterized by the general formula:

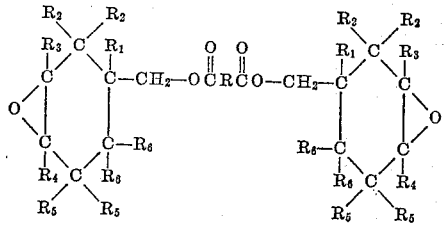

wherein, R represents a divalent hydrocarbon group having from 0 to 10 carbon atoms and $R_1$, $R_2$, $R_3$, $R_4$, $R_5$ and $R_6$ represent groups from the cass of hydrogen and alkyl groups having from 1 to 4 carbon atoms. More particularly, the bis-(3,4-epoxycyclohexylmethyl) hydrocarbon dicarboxylates, useful in the practice of this invention, are those which can be represented by the foregoing formula wherein the diacyloxy group

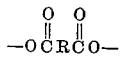

can be regarded as the residue of dicarboxylic acids without the hydroxyl hydrogen atoms. Such dicarboxylic acids are those of the aliphatic series, such as, for example, oxalic acid, in which case, R would not contain any carbon atoms, or maleic acid and pimelic acid, in which cases, R would contain two and five carbon atoms, respectively. Other bis-(3,4-epoxycyclohexylmethyl) hydrocarbon dicarboxylates include those in which the diacyloxy groups

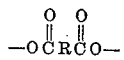

can be regarded as the hydroxyl hydrogen-free residues of dicarboxylic acids of the aromatic series, such as for example, the phthalic acids including phthalic acid, isophthalic acid and terephthalic acid, in which case, R would contain six carbon atoms and dicarboxylic acids of the cycloaliphatic series, such as, the hexahydrophthalic acids, in which case, R would contain six carbon atoms. Particularly useful polymers can be prepared from bis-3,4-epoxycyclohexylmethyl) hydrocarbon dicarboxylates which may be characterized by the foregoing formula wherein the total number of alkyl groups as represented by $R_1$, $R_2$, $R_3$, $R_4$, $R_5$ and $R_6$ attached to any one cyclohexyl ring is not greater than five and the total number of carbon atoms contained in the alkyl groups $R_1$ through $R_6$ attached to any one cyclohexane ring does not exceed 12. Particularly preferred bis-(3,4-epoxycyclohexylmethyl) hydrocarbon dicarboxylates are those characterized by the foregoing formula wherein $R_2$, $R_3$, $R_4$ and $R_5$ are a hydrogens and $R_1$ and $R_6$ are groups from the class of hydrogen and alkyl groups having from 1 to 4 carbon atoms.

The diepoxides characterized by the foregoing formula can be made by the epoxidation of bis-(3,4-cyclohexenylmethyl) hydrocarbon dicarboxylates with an epoxidizing agent, such as acetaldehyde monoperacetate, peracetic acid, and the like, at low to moderate temperatures. The bis-(3-cyclohexenylmethyl) hydrocarbon dicarboxylate starting materials can be prepared by condensing, in accordance with known techniques, a dicarboxylic acid with an unsaturated cycloaliphatic alcohol, such as, a substituted or unsubstituted 3-cyclohexenylmethanol. Illustratively, a 3-cyclohexenyl-methanol and a dicarboxylic acid, or corresponding anhydride can be mixed in a mole ratio of about two moles of alcohol per mole of acid and heated with a trace of sulfuric acid, as an esterification catalyst, in an azeotroping solvent, such as, toluene or benzene. Water formed during the reaction is continuously removed as an azeotrope with said solvent by distillation.

The various 3-cyclohexenylmethanols which are suitable for use in preparing bis-(3-cyclohexenylmethyl) hydrocarbon dicarboxylates can be obtained by the reduction, in accordance with known procedures, of 3-cyclohexenylcarboxaldehydes. These 3-clycohexenylcarboxaldehydes, in turn, can be prepared by a Diels-Alder type reaction of butadiene and homologues of butadiene with alpha,beta unsaturated aliphatic aldehydes, such as, for example, acrolein, methacrolein, crotonaldehydes, and the like. Examples of combinations of reactants which may be employed in preparing 3-cyclohexenylcarboxaldehydes for subsequent reduction to 3-cyclohexenylmethanols include, acrolein and butadiene, acrolein and isoprene, crotanoldahyde and isoprene, methacrolein and isoprene, acrolein and 1,3-pentadiene, crotonaldehyde and pentadiene, methacrolein and pentadiene, acrolein and 2,3-dimethylbutadiene, crotonaldehyde and 2,3-dimethylbutadiene, methacrolein and 2,3-dimethylbutadiene, and the like. Thus the cyclohexenyl ring of the bis-(3-cyclohexenylmethyl) hydrocarbon dicarboxylate starting materials can have a variety of alkyl substituents depending on the choice of starting materials.

Various other alcohols, such as those reported in U.S. Patents 2,454,047 and 2,557,136 and Jour. Am. Chem. Soc. 64, 1497–1499 (1942), can be utilized satisfactorily.

Typical 3-cyclohexenylcarboxaldehydes which can be employed to produce the 3-cyclohexeneylmethanols employed as starting material to produce the bis-(3,4-epoxycyclohexenylmethyl) hydrocarbon dicarboxylates include:

3-cyclohexenecarboxaldehyde; 2,4-dimethyl-3-cyclohexenecarboxaldehyde; 3,4-dimethyl-3-cyclohexenecarboxaldehyde; 3 or 4-methyl - 3 - cyclohexenecarboxaldehyde; 2 - methyl - 3 - cyclohexenecarboxaldehyde; 2,2,5,5-tetramethyl - 3 - cyclohexenecarboxaldehyde; 2,2-dimethyl-5-methyl - 3 - cyclohexenecarboxaldehyde; 2,2-dimethyl-4-methyl-3-cyclohexenecarboxaldehyde; 3 or 4-methyl-6,6-dimethyl-3-cyclohexenecarboxaldehyde; 3 or 4-methyl-6-methyl-3-cyclohexenecarboxaldehyde; 3 or 4-methyl-6-ethyl-3-cyclohexenecarboxaldehyde; 1-methyl-3 or 4-methyl-6-ethyl-3-cyclohexenecarboxaldehyde; 2,2,6-trimethyl-3-cyclohexenecarboxaldehyde; 2,4,6-trimethyl-3-cyclohexenecarboxaldehyde; 2,5,6-trimethyl-3-cyclohexenecarboxaldehyde; 2,2,4-trimethyl-3-cyclohexenecarboxaldehyde; 2,2,5-trimethyl-3-cyclohexenecarboxaldehyde; 3 or 4,6,6-trimethyl-3-cyclohexenecarboxaldehyde; 2,2,5,5,6-pentamethyl-3-cyclohexenecarboxaldehyde; 2,2,5,6-tetramethyl-3-cyclohexenecarboxaldehyde; 1,2,5,5-tetramethyl-3-cyclohexenecarboxaldehyde; 2,2,4,6-tetramethyl-3-cyclohexenecarboxaldehyde; 1,3,5,5-tetramethyl-3-cyclohexenecarboxaldehyde.

The dicarboxylic acids which are useful in preparing bis-(3-cyclohexenylmethyl) hydrocarbon dicarboxylates include any suitable aliphatic dicarboxylic acids, such as, oxalic acid, malonic acid, glutaric acid, succinic acid, alkenyl-substituted succinic acids, adipic acid, pimelic acid, suberic acid, azelaic acid, sebacic acid, maleic acid, itaconic acid, and the like; cycloaliphatic dicarboxylic acids, such as, the hexahydrophthalic acids, and the like, and aromatic dicarboxylic acids, such as, phthalic acid, isophthalic acid, terephthalic acid and the like.

According to this invention, mixtures of bis-(3,4-epoxycyclohexylmethyl) hydrocarbon dicarboxylate compounds, and catalysts can be prepared, and subsequently, reacted at a temperature in the range from 25° to 250° C. to form polymers. The polymerizable compositions can be prepared by adding the catalyst to a bis-(3,4-epoxycyclohexylmethyl) hydrocarbon dicarboxylate compound, or a mixture of bis-(3,4-epoxycyclohexylmethyl) hydrocarbon dicarboxylate compounds, at a low temperature, preferably in the range from 0° C. to 25° C. Sufficient agitation is applied to the mixture in order to make it homogeneous.

After the polymerizable composition is formed, it can be brought to a temperature in the range from 25° C. to 160° C. to form a gel or partially cured composition. The gel, thus formed, then can be maintained at a temperature from 100° C. to 250° C. for a period ranging from thirty minutes to ten hours depending on the temperature, type of catalyst and amount of catalyst to form a polymerized composition.

As a more particular embodiment of this invention, polymerizable compositions may be prepared, from a single bis-(3,4-epoxycyclohexylmethyl) hydrocarbon dicarboxylate as substantially the only polymerizable component. Such composition may be more specifically termed homopolymerizable compositions. Said in a different way, it is meant by the term "homopolymerizable composition," as used herein, a polymerizable composition containing a bis-(3,4-epoxycyclohexylmethyl) hydrocarbon dicarboxylate as substantially the only polymerizable component. These homopolymerizable compositions can be prepared as previously described by mixing a catalyst and a bis-(3,4-epoxycyclohexylmethyl) hydrocarbon dicarboxylate and subsequently can be partially cured to produce a gel as an intermediate homopolymeric product. This gel then can be cured further to produce a homopolymer product.

The catalysts which may be employed with particularly advantageous effects in producing the polymerizable compositions of this invention are the acid-type catalysts and include, in particular, metal halide Lewis acids and mineral acids. Typical metal halide Lewis acids include boron trifluoride, stannic chloride, zinc chloride, aluminum chloride, ferric chloride and the like. Complexes of the various metal halide Lewis acids, such as the etherates and aminates, are also effective. The mineral acids which can be used in the compositions of this invention include sulfuric acid, phosphoric acid, perchloric acid, polyphosphoric acid and the various sulfonic acids, such as toluene sulfonic acid, benzene sulfonic acid, and the like.

While the amount of catalyst employed is not narrowly critical, the catalyst can be employed in any amount in the range from 0.005 weight percent to 10.0 weight percent based on the weight of diepoxide in the composition. It is preferable to add the catalyst as a solution in a suitable solvent. Typical solvents for the metal halide Lewis acid and mineral acid catalysts include organic ethers, such as, diethyl ether, dipropyl ether, organic esters, e.g., methyl acetate, ethyl acetate, ethylpropionate, organic ketones, e.g., acetone, methylisobutylketone, cyclohexanone, organic alcohols, e.g., methanol, 2-ethyl-1-propanol, cyclohexanol, propylene glycol and the like. The mineral acids may be employed as solutions in water, whereas, however, metal halide Lewis acid catalysts tend to decompose in water and thus, aqueous solutions of such Lewis acids are not to be preferred.

While not wishing to be restricted to any particular theory, or mechanics of reaction, it is believed that the polymerization reaction involves etherification through epoxy groups

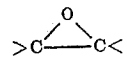

to form ether bonds linking and cross-linking the monomeric molecules. The polymerized compositions produced by this invention are infusible, insoluble in organic solvents, and resistant to strong acids and alkalies. They can be formed into hard, tough, transparent products.

The polymerizable compositions of this invention are useful in the formulation of molding compositions. By partially curing these polymerizable compositions to form a gel and stopping the cure, a heat hardenable composition can be obtained. This heat hardenable composition then can be granulated or reduced to powder form and can be used as a molding composition with or without the addition of other ingredients. Other applications for the compositions of this invention include uses as adhesives, coatings, films, and the like.

The following examples are presented:

EXAMPLE I

*Preparation of bis-(3-cyclohexenylmethyl) oxalate*

A solution of 194 grams (1.73 moles) of 3-cyclohexenylmethyl alcohol, 187 grams (2.37 moles) of pyridine, and 500 cubic centimeters of ethyl ether were placed in a flask fitted with a stirrer, dropping funnel, and reflux condenser. To the stirred contents of the flask were added, over a period of two hours, 100 grams (0.79 mole) of oxalyl chloride. Gentle refluxing occurred, and pyridine hydrochloride was precipitated during the addition. The reaction was allowed to proceed for one hour after the addition was complete, and then the reaction mixture was added to about 750 milliliters of ice water. After mixing well, all the solid dissolved, and the water layer was separated off. The ether layer was extracted once more with 500 milliliters of water, dried with sodium sulfate, and then distilled. There were obtained 175 grams of bis-(3-cyclohexenylmethyl) oxalate, boiling at 180° C. to 185° C. at 5 millimeters of Hg pressure, which analyzed 99 percent pure by saponification and 99.3 percent pure by determination of double bonds. The yield was 80 percent of theory.

EXAMPLE 2

*Preparation of bis-(3,4-epoxycyclohexylmethyl) oxalate*

One hundred seventy-four grams (0.626 mole) of bis-(3-cyclohexenylmethyl) oxalate, prepared from oxalyl chloride and 3-cyclohexenylmethyl alcohol, were placed in a one-liter flask and heated to 35° C. Then 518 grams of a 24.8 weight percent solution of peracetic acid in acetone (1.69 moles of peracetic acid) were added dropwise over a period of one and three-quarter hours to the stirred contents of the flask maintained at 25° C. to 40° C. by external cooling as required. The reaction conditions were maintained for an additional three and one-half hours, and the solution was stored over-night at −11° C.

The reaction solution was added dropwise to a still kettle containing ethylbenzene refluxing at 25 millimeters of Hg pressure. During the addition, acetone, peracetic acid, acetic acid and ethylbenzene were distilled at the column head. After the addition was complete, the kettle was stripped of low-boiling material and there was obtained 190 grams of residue product which analyzed 70.4 percent as bis-(3,4-epoxycyclohexylmethyl) oxalate by determination of epoxide groups and 2.3 percent unreacted bis-(3-cyclohexenylmethyl) oxalate by determination of double bonds. The yield of diepoxide was 69 percent of theory. The residue produced, $n_D^{30}$ 1.4927, $d_{15.6}^{25}$ 1.206, was a clear light yellow, viscous liquid which boiled at 180° C. at 22 millimeters of Hg pressure with slight decomposition.

EXAMPLE 3

*Preparation of bis-(6-methyl-3-cyclohexenylmethyl) sebacate*

One thousand five hundred and ten grams (12 moles) of 6-methyl-3-cyclohexenylmethanol and 606 grams (3 moles) of sebacic acid were placed in a 5-liter, 3-necked flask which was then attached to a 6-inch glass-packed column fitted with an esterification head. The system was heated to 180° C. to 220° C. and 94 grams (5.2 moles) of water were removed while nitrogen was bubbled through the liquid charge. The excess alcohol was then removed under reduced pressure.

The residue product was distiled at 0.7 millimeter of Hg pressure and 904 grams (72 percent yield) of bis-(6-methyl-3-cyclohexenylmethyl) sebacate were obtained. The product analyzed 98.6 percent pure by saponification and by unsaturation analysis. The product, bis-(6-methyl-3-cyclohexenylmethyl) sebacate, was characterized by a boiling point (B.P.) in the range of 207° C. to 210° C. at 0.7 millimeter of Hg pressure and a refractive index $(n_D^{30})$ of 1.4809.

EXAMPLE 4

*Preparation of bis-(3,4-epoxy-6-methylcyclohexylmethyl) sebacate*

One mole of bis-(6-methyl-3-cyclohexenylmethyl) sebacate was placed in a 2-liter, 4-necked flask equipped with a stirrer, thermometer, condenser and dropping funnel. Six hundred and seventy grams of a solution of peracetic acid in ethyl acetate (containing 2.2 moles of peracetic acid) was fed at a rate so regulated as to maintain a reaction temperature of 40° C. to 45° C. The reaction proceeded for 4 hours whereupon an analysis for peracetic acid indicated that over 99 percent of the theoretical amount of peracetic acid had been consumed.

The reaction solution was then added slowly to a flask containing 700 grams of refluxing ethylbenzene and to which was attached a 24-inch glass-packed column. The ethyl acetate, acetic acid, peracetic acid and ethylbenzene in the reaction mixture were stripped at the column head. At the end of the stripping procedure, 452 grams of product were obtained which analyzed 85 weight percent as bis-(3,4-epoxy-6-methylcyclohexylmethyl) sebacate by the pyridine hydrochloride method, and 2.8 weight percent as olefin (calculated as starting olefin) by the bromine method. The product, bis-(3,4-epoxy-6-methylcyclohexylmethyl) sebacate, was characterized by a boiling point (B.P.), of 373° C. at one atmosphere pressure (with some decomposition); a refractive index, $n_D^{30}$, of 1.4837; and a density, $D_4^{27}$, of 1.064.

EXAMPLE 5

*Preparation of bis-(6-methyl-3-cyclohexenylmethyl) maleate*

In a still kettle fitted with a 1⅜ inch by 22 inch packed column, were placed 200 grams (1.72 moles) of maleic anhydride, 500 grams of benzene, 2.4 grams of p-toluenesulfonic acid, and 1.7 grams of a di-(beta-naphthyl)-p-phenylenediamine inhibitor. The kettle contents were refluxed and 476 grams (3.78 moles) of 6-methyl-3-cyclohexenylmethyl alcohol were added dropwise in twenty minutes. Refluxing was continued until 31 grams of water were collected as a lower layer in the still head. The kettle contents were then cooled, and the catalyst was neutralized with 30 grams of sodium acetate, and the mixture was filtered. The filtrate was distilled and there were obtained 388 grams of bis-(6-methyl-3-cyclohexenylmethyl) maleate, boiling at 180° C. to 190° C. at 1 millimeter of Hg pressure, or 200° C. at 2 millimeters of Hg pressure, which analyzed 99.7 percent purity by saponification. The yield was 68 percent of theory.

EXAMPLE 6

*Preparation of bis-(3,4-epoxy-6-methylcyclohexylmethyl) maleate*

Three hundred seventy-eight grams (1.14 moles) of bis-(6-methyl-3-cyclohexenylmethyl) maleate, prepared from 6-methyl-3-cyclohexenylmethyl alcohol and maleic anhydride, were placed in a 2-liter flask and heated to 35° C. Then 1064 grams of a 20.44 weight percent solution of peracetic acid in acetone (2.85 moles of peracetic acid) were added dropwise to the stirred contents of the flask which was maintained at 35° C. by external cooling as required. The addition required one hour and thirty minutes and the reaction conditions were maintained for an additional five hours. Then the solution was stored at −11° C. overnight.

The reaction solution was added dropwise to a still kettle containing ethylbenzene refluxing at 25 millimeters of Hg pressure. During the addition, acetone, acetic acid, peracetic acid and ethylbenzene were distilled off at the column head. After the addition, all low-boiling material was stripped off, and there were obtained as residue product 420 grams of a light-colored, viscous liquid analyzing 85 weight percent as bis-(3,4-epoxy-6-methylcyclohexylmethyl) maleate, corresponding to a yield of 86 weight percent based on theoretical yield. The material distilled with slight decomposition at 210° C. to 220° C. at 1 millimeter of Hg pressure. The filtered residue product was a clear light yellow viscous liquid having a refractive index, $n_D^{30}$, of 1.5003, and a density, $d_{15}^{25}$, of 1.51.

EXAMPLE 7

*Preparation of bis-(3-cyclohexenylmethyl) terephthalate*

A mixture of 406 grams (2.09 moles) of dimethyl terephthalate, 1174 grams (10.49 moles) of 3-cyclohexenylmethyl alcohol, and 15.0 grams (0.278 mole) of sodium methylate was heated at 150° C. for forty-five minutes in a still kettle fitted with 1⅜ inch by 24 inch packed column. During this period, 109 grams of methanol were removed as a distillate. This corresponds to 82 weight percent of the theoretical amount. The mixture in the kettle was then cooled, and the crystals were isolated by filtration, washed thoroughly with cold methanol, and dried. The crystalline material was purified by recrystallization from ethanol, and there were obtained 310 grams of purified bis-(3-cyclohexenylmethyl) terephthalate in the form of slightly yellow needles having a melting point of 100° C. to 101° C. and analyzing 100 percent purity by saponification. The yield isolated ester was 42 weight percent of theory. Additional product remained in the mother liquors.

EXAMPLE 8

*Preparation of bis-(3,4-epoxycyclohexylmethyl) terephthalate*

To a well-stirred suspension of 60 grams (0.17 mole) of bis-(3-cyclohexenylmethyl) terephthalate in 240 grams of butyl acetate at 40° C., there were added, over a period of thirty minutes, 366 grams of a 24.6 weight percent solution of peracetic acid in acetone (1.17 moles of peracetic acid). The solution was stirred and held at 40° C. for an additional hour, after which an analysis for peracetic acid showed that the theoretical amount had reacted. On cooling the reaction mixture, the product crystallized in the form of white needles, which were isolated by filtration. Two additional crops of crystals were obtained by evaporation of the mother liquor. The crystals, after being washed with acetone and dried, had a melting point of 128° C. to 130° C. and weighed 39 grams, corresponding to a 60 weight percent yield of bis-(3,4-epoxycyclohexylmethyl) terephthalate. The purity, determined by analysis for oxirane oxygen, was 96.6 percent. A small sample, recrystallized twice from ethyl acetate, had a melting point of 131.5° C. to 133° C. and a purity of 99.9 percent by analysis for oxirane oxygen.

EXAMPLE 9

*Polymer from bis-(3,4-epoxy-6-methylcyclohexylmethyl) succinate*

A mixture containing 8 grams of bis-(3,4-epoxy-6-methylcyclohexylmethyl) succinate and 0.2 gram of a piperidine-boron trifluoride complex formed by the reaction of equimolar quantities of piperidine and boron trifluoride was prepared and brought to a temperature of about 60° C. The mixture thus prepared was held at 60° C. until a homogeneous melt was formed, which was accomplished in about 1 minute. The mixture then was subjected to a temperature of 120° C. and a gel was formed in about 4 minutes. The gel was held at 120° C. for an additional 3.5 hours and then at 160° C. for 6 hours in order to effect a strong cure. A tough, transparent, solvent resistant polymer having a Barcol hardness of 30 was produced.

EXAMPLE 10

*Polymer from bis-(3,4-epoxycyclohexylmethyl) oxalate*

A mixture containing 8 grams of bis-(3,4-epoxycyclohexylmethyl) oxalate and 0.2 gram of a piperidine-boron trifluoride complex formed by the reaction of equimolar quantities of piperidine and boron trifluoride was prepared and brought to a temperature of about 60° C. The mixture thus prepared was held at 60° C. until a homogeneous melt was formed, which was accomplished in about 1 minute. The mixture then was subjected to a temperature of 120° C. and a gel was formed in about 1 minute. The gel was held at 120° C. for an additional 4.5 hours and then at 160° C. for 6 hours in order to effect a strong cure. A hard, transparent polymer having a Barcol hardness of 39 was formed.

EXAMPLE 11

*Polymer from bis-(3,4-epoxy-6-methylcyclohexylmethyl) sebacate*

A mixture was prepared from 8 grams of bis-(3,4-epoxy-6-methylcyclohexylmethyl) sebacate and 8 drops at about 0.02 gram per drop of a 25 weight percent solution of sulfuric acid in water (a catalyst concentration of about 0.5 weight percent based on diepoxide). The mixture thus formed then was maintained at a temperature of about 120° C. for 1.4 hours during which time a gel was formed. The gel was held at 120° C. for an additional 7.6 hours and then brought to 160° C. where it was held for 6 hours. There was obtained a tough, transparent polymer.

The diepoxides disclosed herein can be copolymerized with polyfunctional materials containing at least two groups which are capable of reacting with epoxy groups. Examples of groups capable of reacting with epoxy groups include carboxyl, amino, amido, imino, imido, epoxy, hydroxyl, mercapto, phosphino sulfo, and the like. Polyfunctional materials which may be copolymerized with diepoxides of this invention include polycarboxylic acids, polycarboxylic acid anhydrides, polyhydric compounds, primary amines, polyamines, amides, polyamides, imines, polyimines, imides, polyimides, polythiols, other epoxides and polyepoxides and the like.

What is claimed is:

1. A polymerizable composition comprising a diepoxide represented by the general formula:

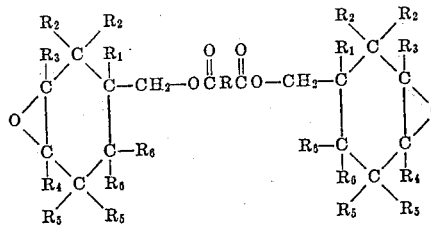

wherein R represents the residue after removal of the two carboxy groups of a hydrocarbon dicarboxylic acid which contains from 2 to 12 carbon atoms; and wherein each $R_1$, $R_2$, $R_3$, $R_4$, $R_5$ and $R_6$ is selected from the group consisting of hydrogen and alkyl groups which have from 1 to 4 carbon atoms; and 0.005 to 10.0 weight percent of an inorganic acid catalyst.

2. A polymerizable composition comprising bis-(3,4-epoxy-6-methylcyclohexylmethyl) maleate; and 0.005 to 10.0 weight percent of an inorganic acid catalyst.

3. A polymerizable composition comprising bis-(3,4-epoxy-6-methylcyclohexylmethyl) succinate; and 0.005 to 10.0 weight percent of an inorganic acid catalyst.

4. A polymerizable composition comprising bis-(3,4-epoxy-6-methylcyclohexylmethyl) sebacate; and 0.005 to 10.0 weight percent of an inorganic acid catalyst.

5. A process for producing polymers which comprises reacting at a temperature of 25° C. to 250° C. diepoxides represented by the general formula:

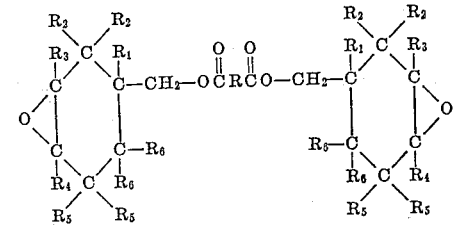

wherein R represents the residue after removal of the two carboxy groups of a hydrocarbon dicarboxylic acid which contains from 2 to 12 carbon atoms; and wherein each $R_1$, $R_2$, $R_3$, $R_4$, $R_5$ and $R_6$ is selected from the group consisting of hydrogen and alkyl groups which have from 1 to 4 carbon atoms; in the presence of an inorganic acid catalyst.

6. A process as claimed in claim 5 wherein the acid catalyst is a mineral acid catalyst.

7. A process as claimed in claim 5 wherein the inorganic acid catalyst is a metal halide Lewis acid catalyst.

8. A homopolymerizable composition comprising bis-(3,4-epoxycyclohexylmethyl) oxalate and 0.005 to 10.0 weight percent of boron trifluoride.

9. A homopolymerizable composition comprising bis-(3,4-epoxycyclohexylmethyl) terephthalate and 0.005 to 10.0 weight percent of an inorganic acid catalyst.

10. A resinous polymer prepared by reacting the composition of claim 1 under polymerization conditions.

11. A resinous polymer prepared by reacting the composition of claim 2 under polymerization conditions.

12. A resinous polymer prepared by reacting the composition of claim 3 under polymerization conditions.

13. A resinous polymer prepared by reacting the composition of claim 4 under polymerization conditions.

14. A resinous polymer prepared by reacting the composition of claim 8 under polymerization conditions.

15. A resinous polymer prepared by reacting the composition of claim 9 under polymerization conditions.

References Cited in the file of this patent

UNITED STATES PATENTS

| | | |
|---|---|---|
| 2,460,195 | Segall | Jan. 25, 1949 |
| 2,543,419 | Niederhauser | Feb. 27, 1951 |
| 2,623,023 | Koroly | Dec. 23, 1952 |
| 2,739,161 | Carlson | Mar. 20, 1956 |
| 2,750,395 | Phillips et al. | June 12, 1956 |